United States Patent [19]
Cooper et al.

[11] 3,989,903
[45] Nov. 2, 1976

[54] MULTI-DIRECTIONAL SOUND SIGNAL RECORDING AND/OR REPRODUCING SYSTEM WITH CROSSTALK COMPENSATION MEANS

[76] Inventors: Duane H. Cooper, W. Daniel St. 918, Champagne, Ill. 61820; Toshihiko Takagi; Yoshihisa Kamo, both c/o Kawasaki Factory, Nippon Columbia Kabushikikaisha,, Minato, Kawasaki, Kanagawa, Japan

[22] Filed: May 9, 1974

[21] Appl. No.: 468,268

[30] Foreign Application Priority Data
May 10, 1973 Japan.................................. 48-52077

[52] U.S. Cl............... 179/100.4 ST; 179/100.1 TD; 179/1 GQ; 179/15 BT; 179/15 AN
[51] Int. Cl.².......................................... G11B 3/74
[58] Field of Search.......... 179/100.4 ST, 100.1 TD, 179/1 GQ, 15 AN, 15 BT

[56] References Cited
UNITED STATES PATENTS

| | | | |
|---|---|---|---|
| 3,209,271 | 9/1965 | Smith................................... | 329/122 |
| 3,686,471 | 8/1972 | Takahashi.................. | 179/100.4 ST |
| 3,883,700 | 5/1975 | Bauer........................ | 179/100.4 ST |
| 3,896,271 | 7/1975 | Ishigaki...................... | 179/100.4 ST |

*Primary Examiner*—Bernard Konick
*Assistant Examiner*—Alan Faber
*Attorney, Agent, or Firm*—Fitch, Even, Tabin & Luedeka

[57] ABSTRACT

A device which reduces beat distortion caused by crosstalk between subchannel signals in a multichannel sound system. To effect reduced beat distortion, one component present in both the sum and difference subchannel is attenuated before the subchannels are modulated.

11 Claims, 18 Drawing Figures

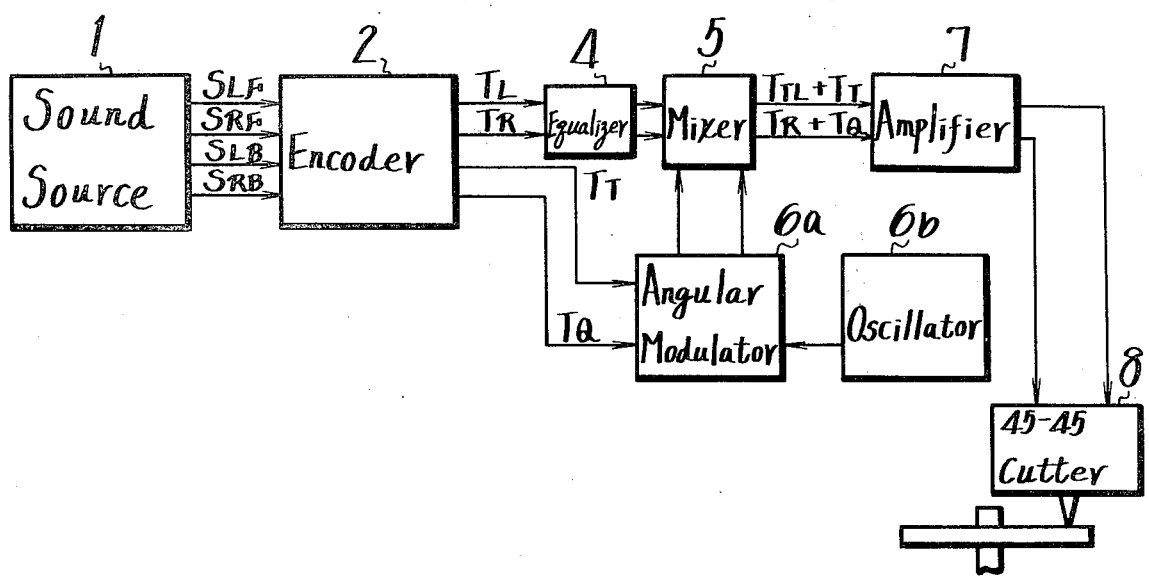
Fig-1 (PRIOR ART)
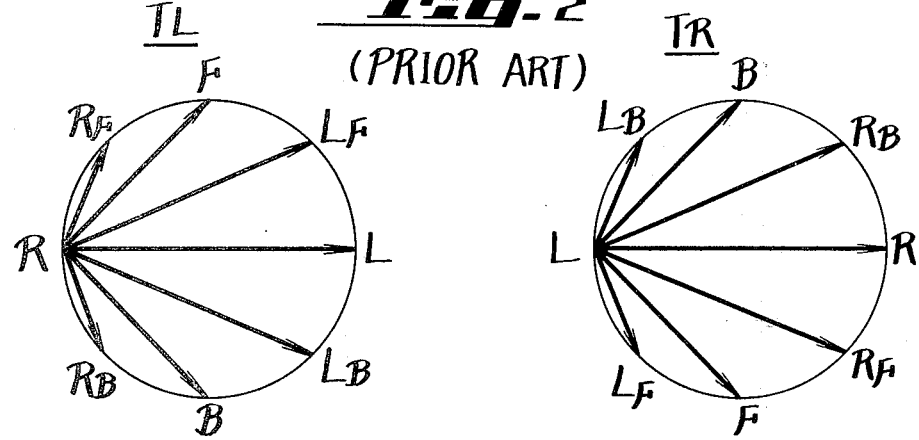
Fig-2 (PRIOR ART)
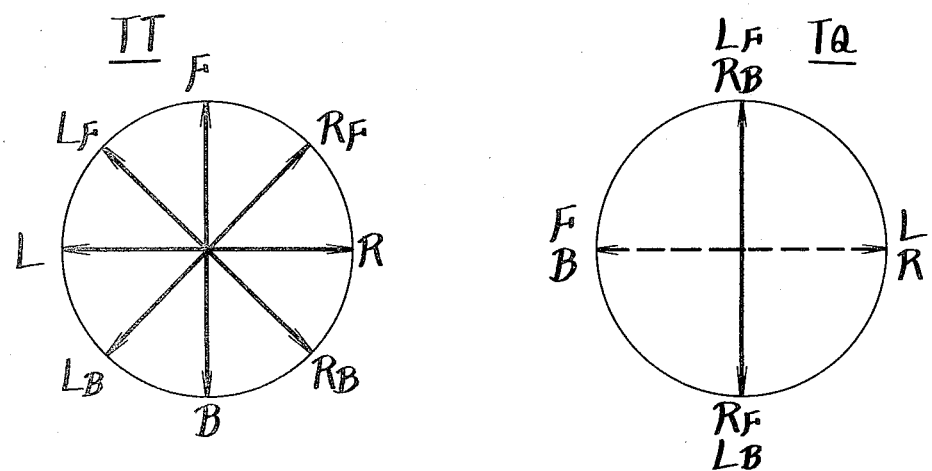

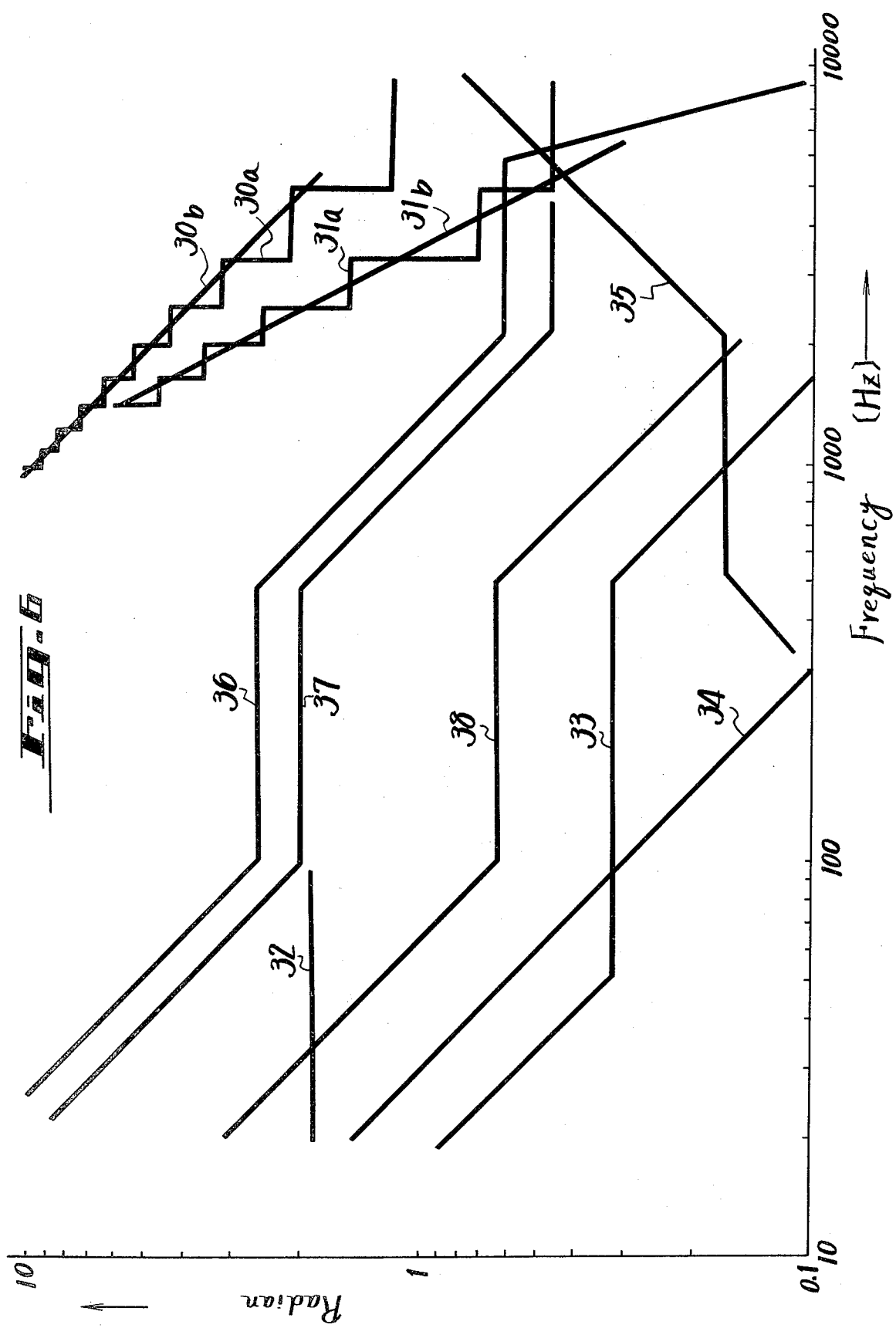

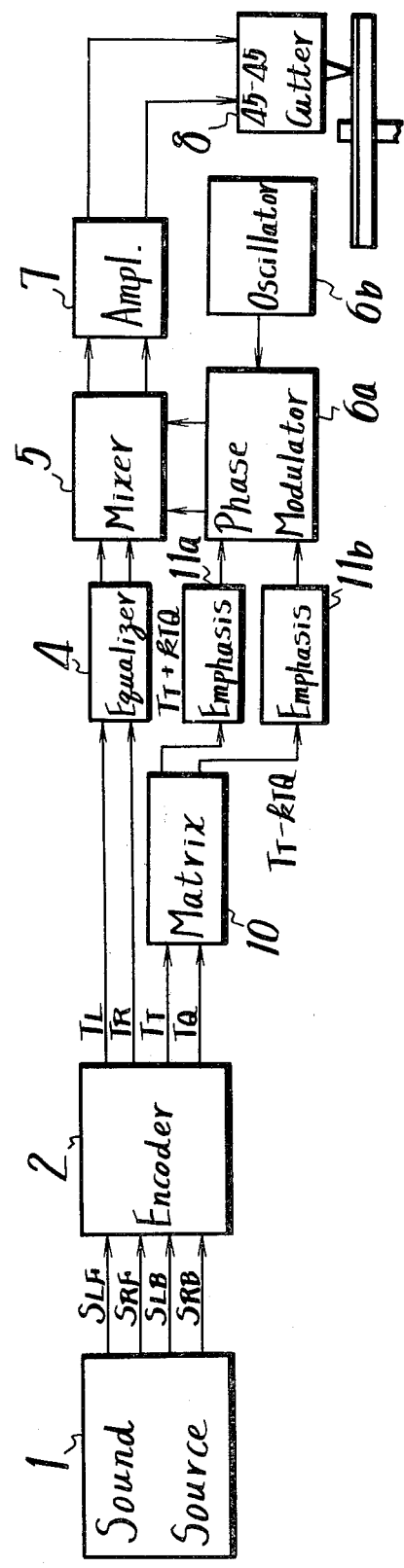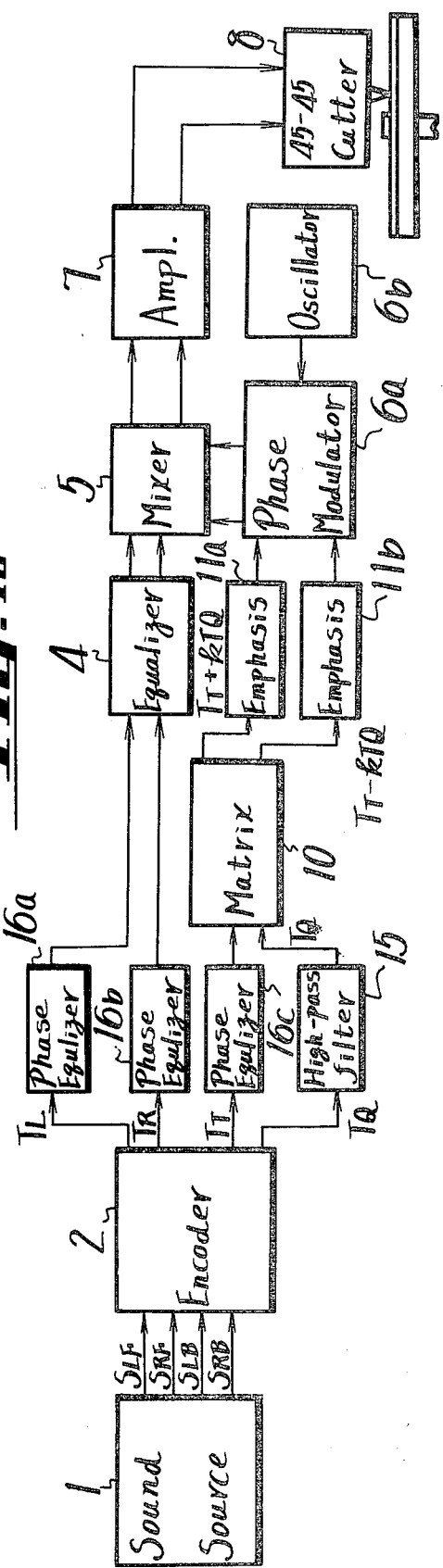

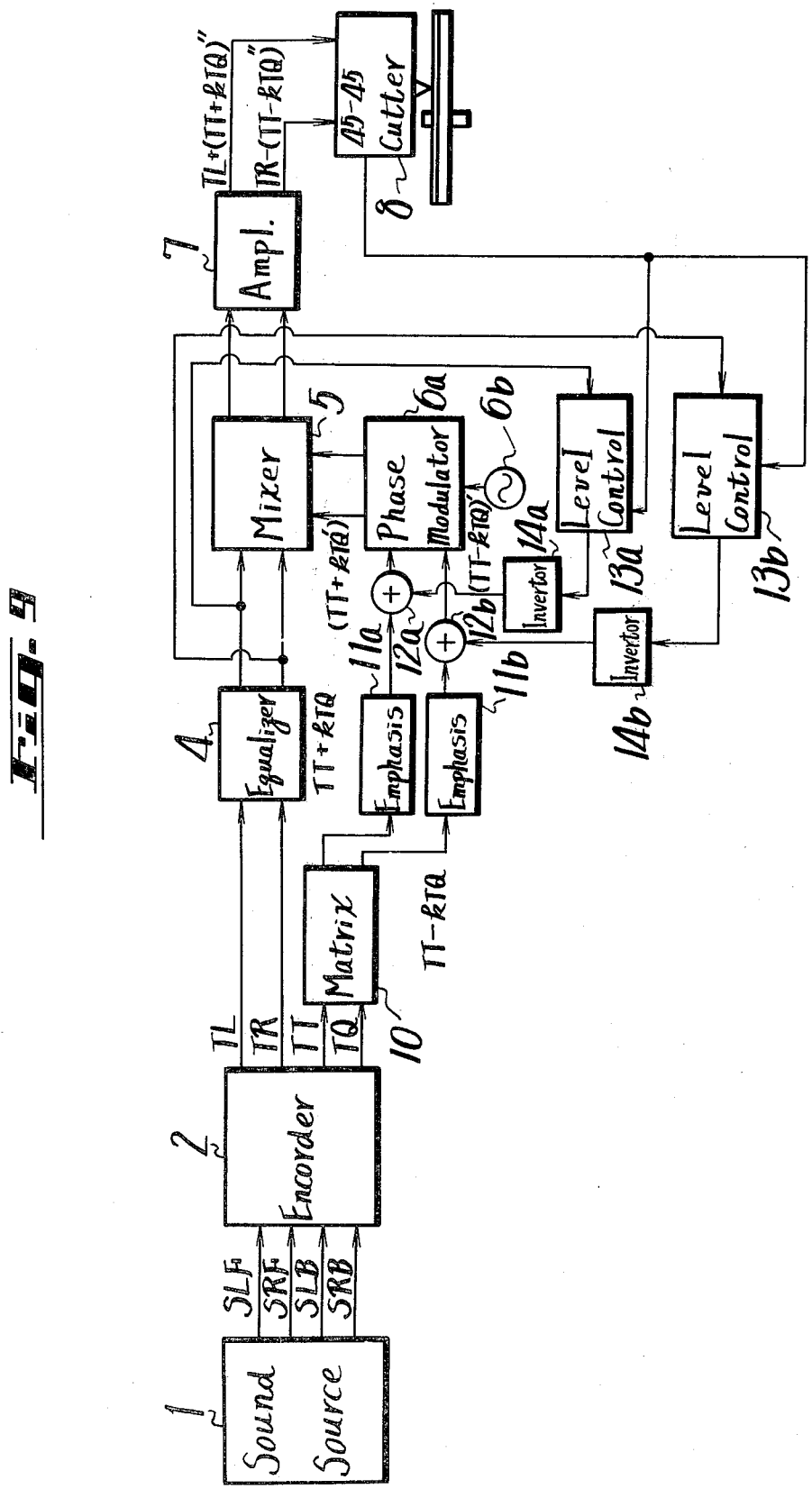

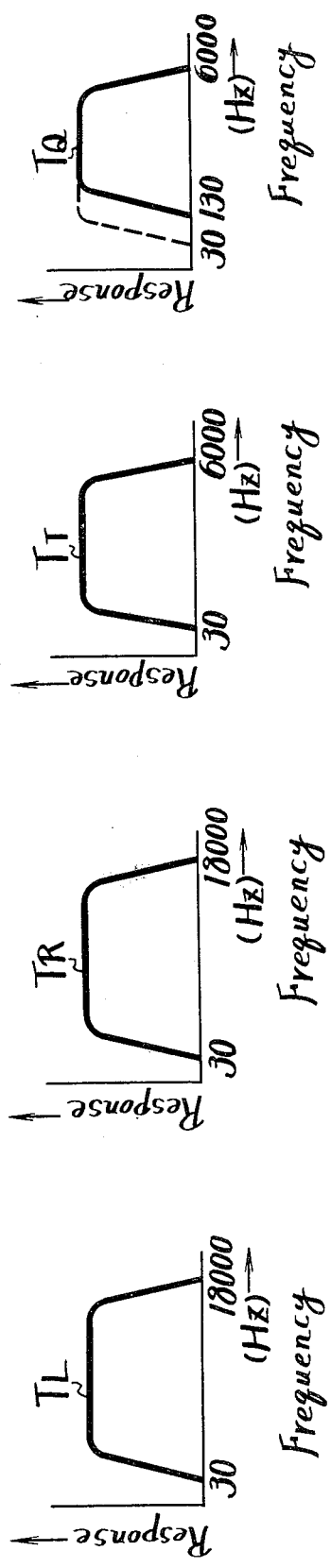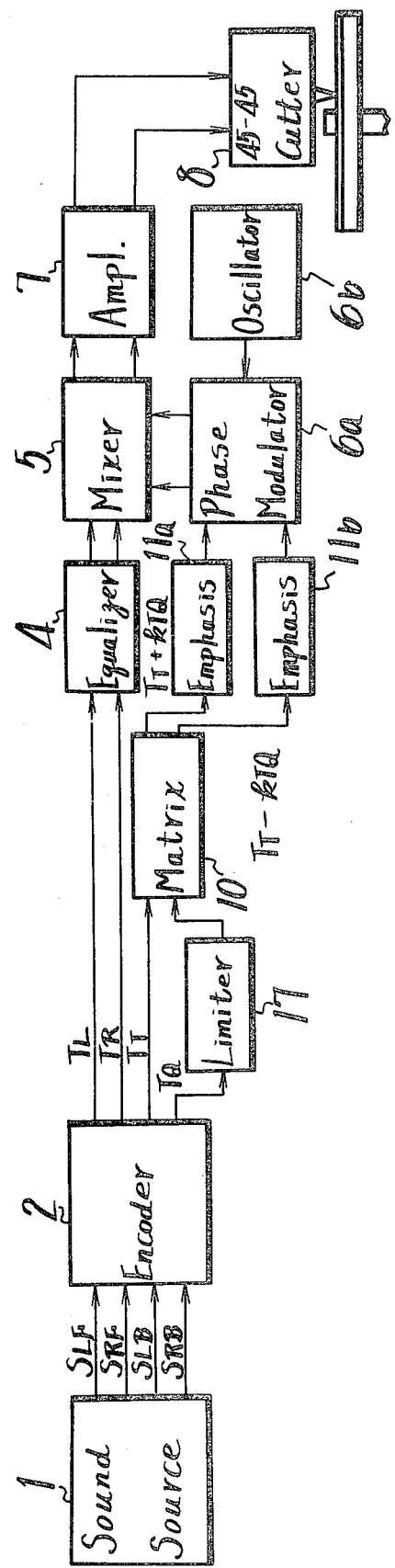

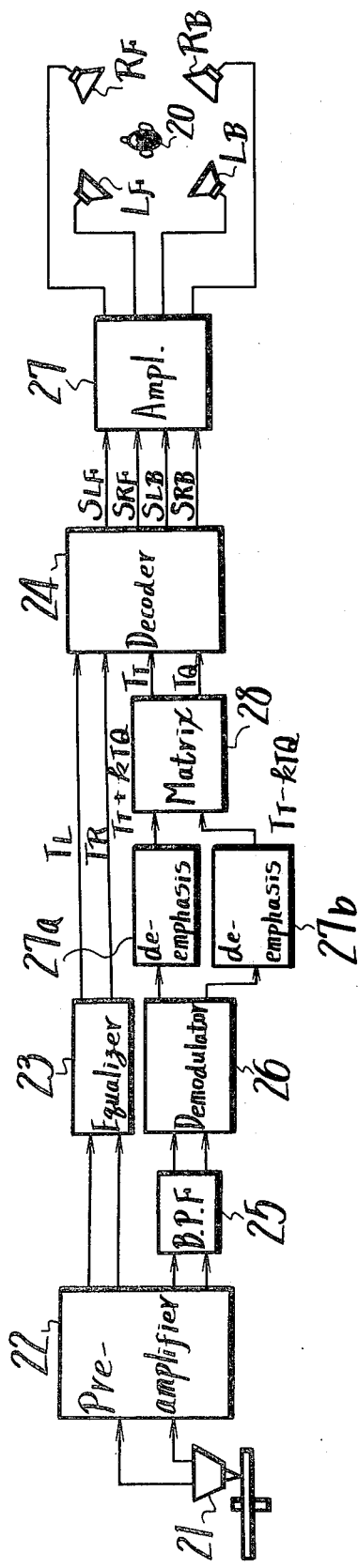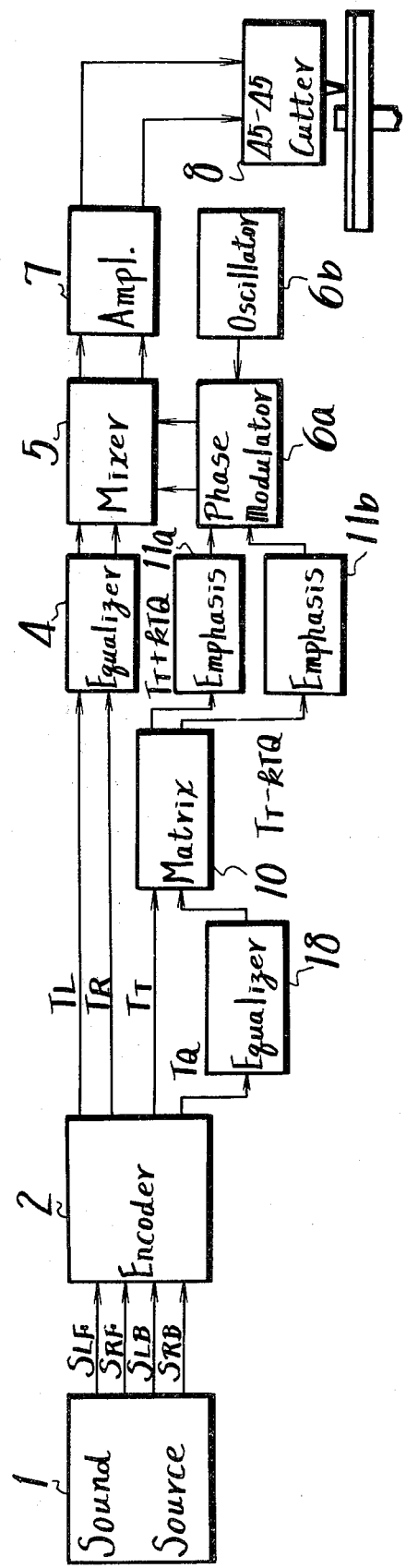

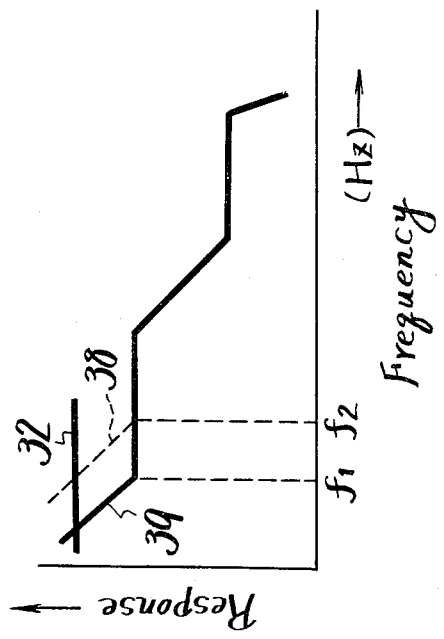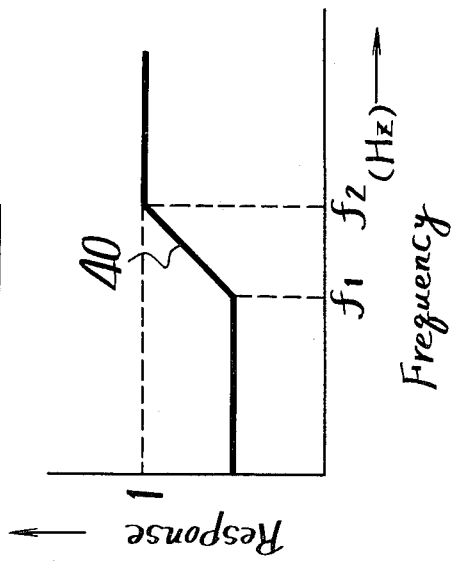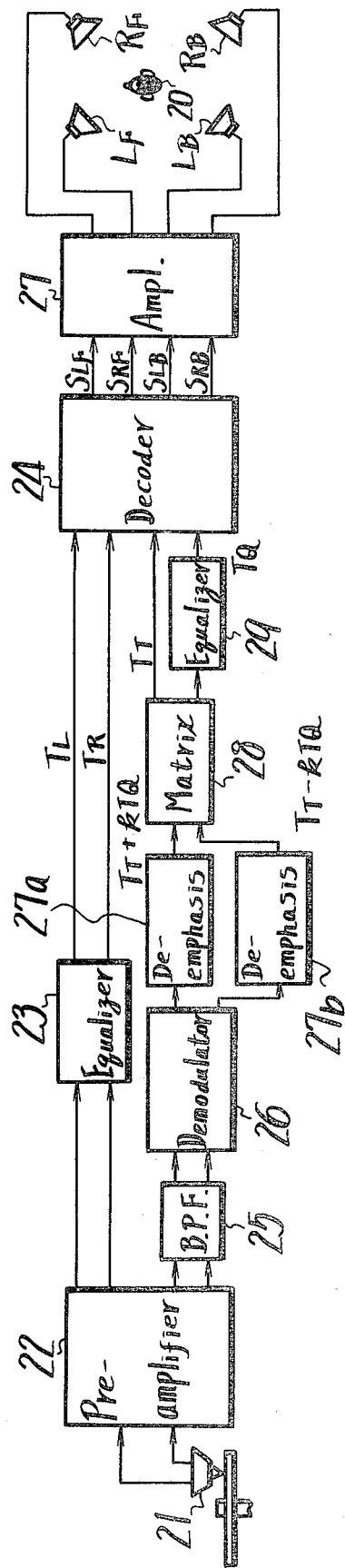

MULTI-DIRECTIONAL SOUND SIGNAL RECORDING AND/OR REPRODUCING SYSTEM WITH CROSSTALK COMPENSATION MEANS

BACKGROUND OF THE INVENTION

1. Field of the Invention

This invention relates to improvements in or relating to a multi-directional sound signal recording and/or reproducing system, commonly known under the name of a discrete 4 channel stereo system, which is designed for multiplex recording of a plurality of main channel signals and a plurality of carrier modulated type sub-channel signals in a single sound groove of a record and/or reproducing of the recorded signals therefrom.

2. Description of the Prior Art

One of such types of systems heretofore employed in the art is a "Universal Matrix system" (hereinafter referred to as the UM system) proposed by Duane H. Cooper, one of the present inventors.

The UM system is excellent in compatibility with a conventional mono-aural system and an ordinary two channel stereo system and capable of reproducing of sound sources with high fidelity, ensures the locations of sound images to be distinct and permits freedom of disposition of speakers; and hence is very advantageous in practical use.

However, the multi-directional sound system such as the UM system which employs a carrier sub-channel signal encounters the following problems.

One of the problems is that since the pass band of the carrier sub-channel signal is limited for narrowing a required frequency band of the system as a whole, clipping distortion is caused at the time of overmodulation.

Another problem is the generation of beat distortion in a demodulated sub-channel signal due to cross-talk between the carrier sub-carrier channels in the recording system and, mainly in the reproducing system.

Still another problem is the generation of cross-talk from the main channel signal to the sub-channel signal (hereinafter referred to as the Up-talk) which is caused by a tracking error and tracing distortion in the reproducing system.

SUMMARY OF THE INVENTION

A principal object of this invention is to provide a multi-directional sound signal recording and/or reproducing system which is free from the beat distortion resulting from cross-talk between the sub-channel signals.

Other objects, features and advantages of this invention will become apparent from the following description made with reference to the accompanying drawings.

BRIEF DESCRIPTION OF THE DRAWINGS

FIG. 1 is a block diagram showing one example of a record system for multi-directional sound signals;

FIG. 2 shows a series of vector diagrams of sub-channel signals encoded in the record cutting system;

FIG. 6 is a graph showing intereference with the sub-channel signal and sub-channel signal modulation curves;

FIG. 8 is a block diagram illustrating one example of a recording system according to this invention;

FIG. 9 is a block diagram showing another example of the recording system according to this invention;

FIG. 10 is a block diagram showing another example of the record system according to this invention;

FIG. 11 shows a series of frequency spectrum diagrams, for explaining the example of FIG. 10;

FIG. 12 is a block diagram illustrating another example of the record system of this invention;

FIG. 13 is a block diagram showing one example of a reproducing system according to this invention;

FIG. 14 is a block diagram illustrating another example of the record system of this invention;

FIGS. 15 and 16 are graphs, for explaining the record system depicted in FIG. 14; and FIG. 17 is a block diagram showing a reproducing system corresponding to the record system shown in FIG. 4.

DESCRIPTION OF THE PREFERRED EMBODIMENTS

Figure 3A:
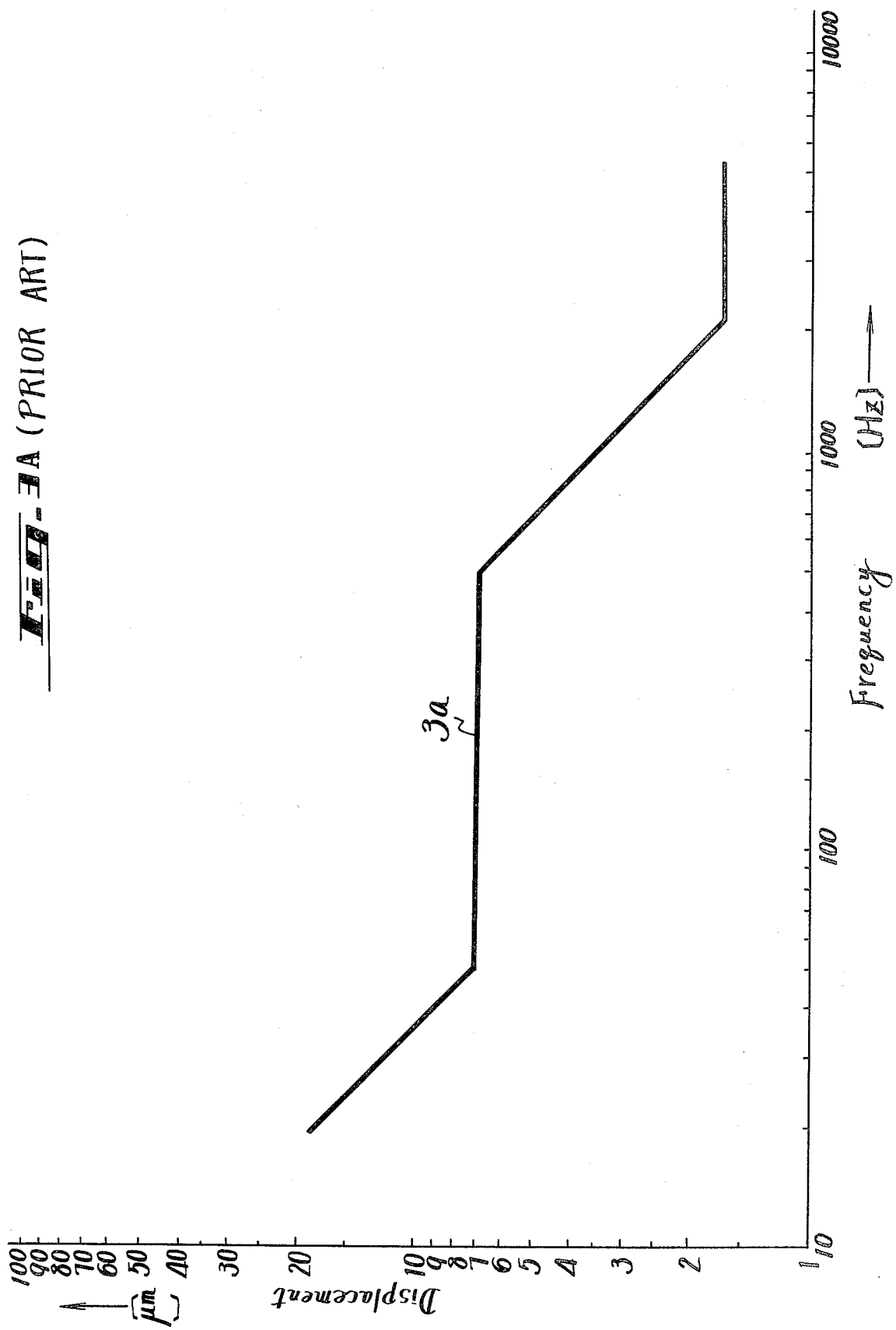
FIGS. 3A and 3B are graphs showing recording RIAA characteristics of main channel signals.

To facilitate a better understanding of this invention, the UM system will be described first as being applied to a 4 channel stereo system. FIG. 1 shows in block form its recording system. Reference numeral 1 indicates a sound source, from which four signals $S_{LF}$, $S_{RF}$, $S_{LB}$ and $S_{RB}$ are derived. These four signals are obtained, for example, from microphones disposed corresponding to speakers LF, RF, LB and RB of a record playback system shown in FIG. 5 which are placed orthogonally (2 + 2) in a listening space surrounding a listener 20. Electric signals obtained from the microphones corresponding to the speakers LF, RF, LB and RB are identified by $S_{LF}$, $S_{RF}$, $S_{LB}$ and $S_{RB}$. The four signals are applied to an encoder 2 to derive therefrom signals TL, TR, TT and TQ which bear the relationships given by the following equation (1). The signals TL and TR are referred to as main channel signals and the signals TT and TQ are referred to as sub-channel signals.

$$\begin{aligned}
TL &= 0.924S_{LF} < +22.5° + 0.383S_{RF} < +67.5° \\
&+ 0.383S_{RB} < -67.5° + 0.924S_{LB} < -22.5° \\
TR &= 0.383S_{LF} < -67.5° + 0.924S_{RF} < -22.5° \\
&+ 0.924S_{RB} < +22.5° + 0.383S_{LB} < +67.5° \\
TT &= 1.414S_{LF} < +135° + 1.414S_{RF} < +45° \\
&+ 1.414S_{RB} < -45° + 1.414S_{LB} < -135° \\
TQ &= 1.414S_{LF} < +90° + 1.414S_{RF} < -90° \\
&+ 1.414S_{RB} < +90° + 1.414S_{LB} < -90°
\end{aligned} \quad (1)$$

The vectors of the signals TL, TR, TT and TQ are such as shown in FIG. 2.

The main channel signals TL and TR from the encoder 2 are supplied to a mixer circuit 5 through a recording equalizer 4. The characteristics of the recording equalizer 4 are such as indicated by curves in FIGS. 3A and 3B which have been standardized as RIAA recording characteristics. On the other hand, the sub-channel signals TT and TQ are supplied to an angular modulator 6a to effect angular modulation of a carrier signal fc derived from an oscillator 6b. The carrier of the frequency fc, thus angular-modulated by the sub-channel signals TT and TQ, are referred to as modulated sub-channel signals TT' and TQ'. The modulated sub-channel signals TT' and TQ' are added to the main channel signals in the mixer circuit 5 to provide two transmission signals (TL + TT') and (TR + TQ'). These two transmission signals are applied through a recording amplifier 7 to a 45—45 cutter 8 which is similar to that heretofore employed for the making of stereo records. By the 45—45 cutter 8, the signals (TL + TT') and (TR + TQ') are recorded on the walls of a sound groove, respectively. This is shown in FIG. 4. Namely, the main channel signal TL and the modulated sub-channel signal TT' are recorded in the one wall 9L of the sound groove and the main channel signal TR and the modulated sub-channel signal TQ' are recorded on the other wall 9R.

Figure 5:
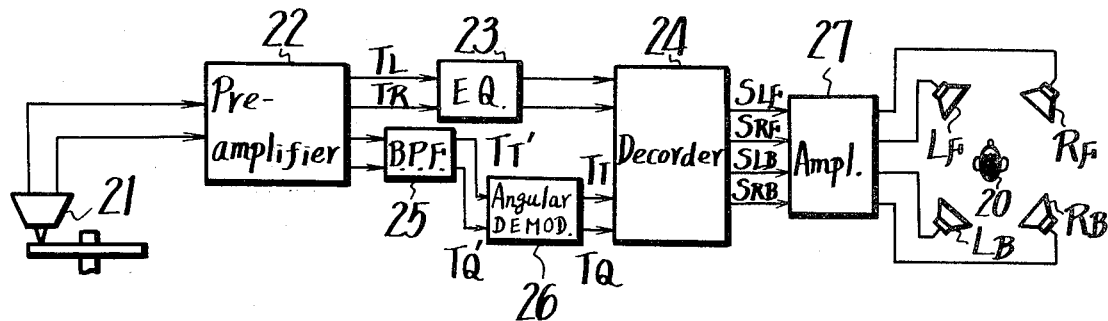
FIG. 5 is a block diagram illustrating one example of a multi-directional sound signal reproducing system.

The reproducing system for the record having thus recorded thereon the sound signals is illustrated in block form in FIG. 5. A reproduced signal from a pickup 21 is applied to a pre-amplifier 22. The main channel signals TL and TR derived from the pre-amplifier 22 are supplied to a decoder 24 through a reproducing equalizer 23 whose characteristics are opposite to those of the recording equalizer 4. The modulated sub-channel signals TT' and TQ' derived from the pre-amplifier 22 through a band-pass filter 25 are demodulated by an angular demodulator 26. The sub-channel signals TT and TQ from the angular demodulator 26 are supplied to the decoder 24 together with the main channel signals TL and TR to provide signals similar to the audio signals $S_{LF}$, $S_{RF}$, $S_{LB}$ and $S_{RB}$ derived from the sound source 1. These signals $S_{LF}$, $S_{RF}$, $S_{LB}$ and $S_{RB}$ are supplied through an amplifier 27 to the speakers LF, RF, LB and RB of the (2+2) disposition corresponding thereto, respectively.

Now, a further detailed description will be given with regard to the aforementioned problems encountered in the carrier sub-channel type record 4 channel stereo system.

A first problem concerns a limit of the amount of frequency deviation. Overmodulation of the sub-channel signals when modulated at a low frequency is caused when peak frequency deviation exceeds a frequency limit determined for the modulated sub-channels. However, when modulated with a high-frequency signal, the modulated sub-channel signals have frequency components exceeding the peak frequency deviation. For example, a maximum frequency deviation such that 5% of the energy of a carrier falls outside of a band of 10KHz on either side thereof takes such a stepwise form as indicated by 30a in FIG. 6. This tendency can be shown such as indicated by 30b. The demodulation distortion occurs when the modulated sub-channel signals are applied to the band-pass filter 24 for separating the modulated sub-channel signal in the reproducing system. For example, a limit at which harmonic distortion of 5% is caused is such as a stepwise curve indicated by 31a in FIG. 6. In the case of a symmetrical filter, the harmonic distortion is an odd-numbered order one and, in the case of a single side band filter, the harmonic distortion is an even-numbered order one. The straight line 31b shows the general tendency. The sub-channel signal modulation curve should not exceed the lines 30a and 30b.

A second problem is the beat distortion which is caused in the modulated sub-channel signals when cross-talk exists between the modulated sub-channel signals. In general, cross-talk occurs when signals are recorded on the disc record and when reproduced therefrom. The cross-talk during recording is caused by a cutter head, a cutting stylus, etc. and, for the elimination of the cross-talk, an expensive cutter head and a cutting stylus are required. The cross-talk during reproducing is caused when the pickup picks up the signal from the sound groove of the disc record and, from the manufacturing point of view, it is difficult to completely eliminate the cross-talk resulting from the pickup. In the process of generation of the beat distortion due to the cross-talk in the carrier frequency band, if the relative phase deviation is large, non-linear, complicated harmonic distortion and cross modulation distortion occur. Namely, where the cross-talk on the groove walls has the component of the same phase, the distortion becomes an odd-numbered order component and, if x is taken as a peak phase deviation difference, the distortion is in proportion to $J_{2n-1(x)/x}$ ($n$ being a positive integer). Where the cross-talk is an orthogonal component, the distortion has an even-numbered order component and proportional to $J_{2n(x)/x}$ ($n$ being a positive integer). $J_{n(x)}$ is a Bessel function of the nth order of the first kind. The distortion is in proportion to the magnitude of the cross-talk and the component $J_{3(x)/x}$ becomes maximum when $x = 3.6$, the component $J_{2(x)/x}$ becomes maximum when $x = 2.3$ and the both components $J_{2(x)/x}$ and $J_{3(x)/x}$ become equal to each other when $x = 3.8$. The harmonic distortion in this case accounts for about 2% when the cross-talk is -20dB. A modulation index of 3.8 radians is a limit of the generation of distortions of the lower and higher orders and this is a modulation index difference and the half of it is indicated by 32 in FIG. 6. Where the sub-channel signal modulation curve exceeds the line 32, the beat distortion increases.

A third problem is a cross-talk from the main channel signal to the sub-channel signal which is caused during reproducing. This cross-talk is referred to as up-talk. On the other hand, a cross-talk from the sub-channel signal to the main channel signal is referred to as a down-talk. The down-talk presents a problem in the case of a tracing distortion but offers no problem in the case of the sub-channel signals being recorded at a constant speed. While, the uptalk is caused by both of a tracing angle error and a tracing distortion.

With the up-talk due to the tracking angle error, if the modulated sub-channel signal is less displaced than the main channel signal, the modulated sub-channel signal is subjected to a phase modulation of ($2\pi/\lambda c$ am tan$\phi$), where am is the displacement of the main channel signal; $\lambda c$ is the wavelength of a carrier signal; and $\phi$ is the tracking error angle. For example, the up-talk due to a vertical tracking error angle is caused mainly by the vertical component (a difference signal component) of the main channel signal. Where the main channel signals are recorded with the RIAA recording characteristics shown in FIG. 3, the up-talk in the case of a vertical tracking error angle of 5° is produced within the limit indicated by 33 in FIG. 6.

Further, though independent of the influence of the main channel signals, a distortion such as rumble is produced in the demodulated signal due to flutter. This distortion produces a component similar to that of the up-talk. For example, the influence of flutter of 0.1% on the sub-channel is indicated by 34. Accordingly, the sub-channel signal modulation curve should be spaced apart from the lines 33 and 34.

The up-talk due to the tracing distortion is produced from the main channel signals to the sub-channel signals on the two groove walls, respectively, when the pickup reproduces the record because the diameter of the tip of the stylus of the pickup is finite. The up-talk resulting from the tracing distortion is related to the line speed S (cm/sec) of the sound groove of the record, the peak speed amplitude V (cm/sec) of the main channel signal in the sound groove and the radius r(cm) of the spherical surface of the tip of the stylus. The amount of phase modulation of the sub-channel signal is given by the following equation in terms of the phase modulation index $m$:

$$m = \frac{rvw}{S^2}$$

where w is a carrier angular frequency. If the diameter of the sound groove is taken as D (cm) and if the number of revolutions per minute is taken as N, it follows that $$S = \frac{\pi DN}{60} \text{(cm/sec)}.$$

Figure 3B:
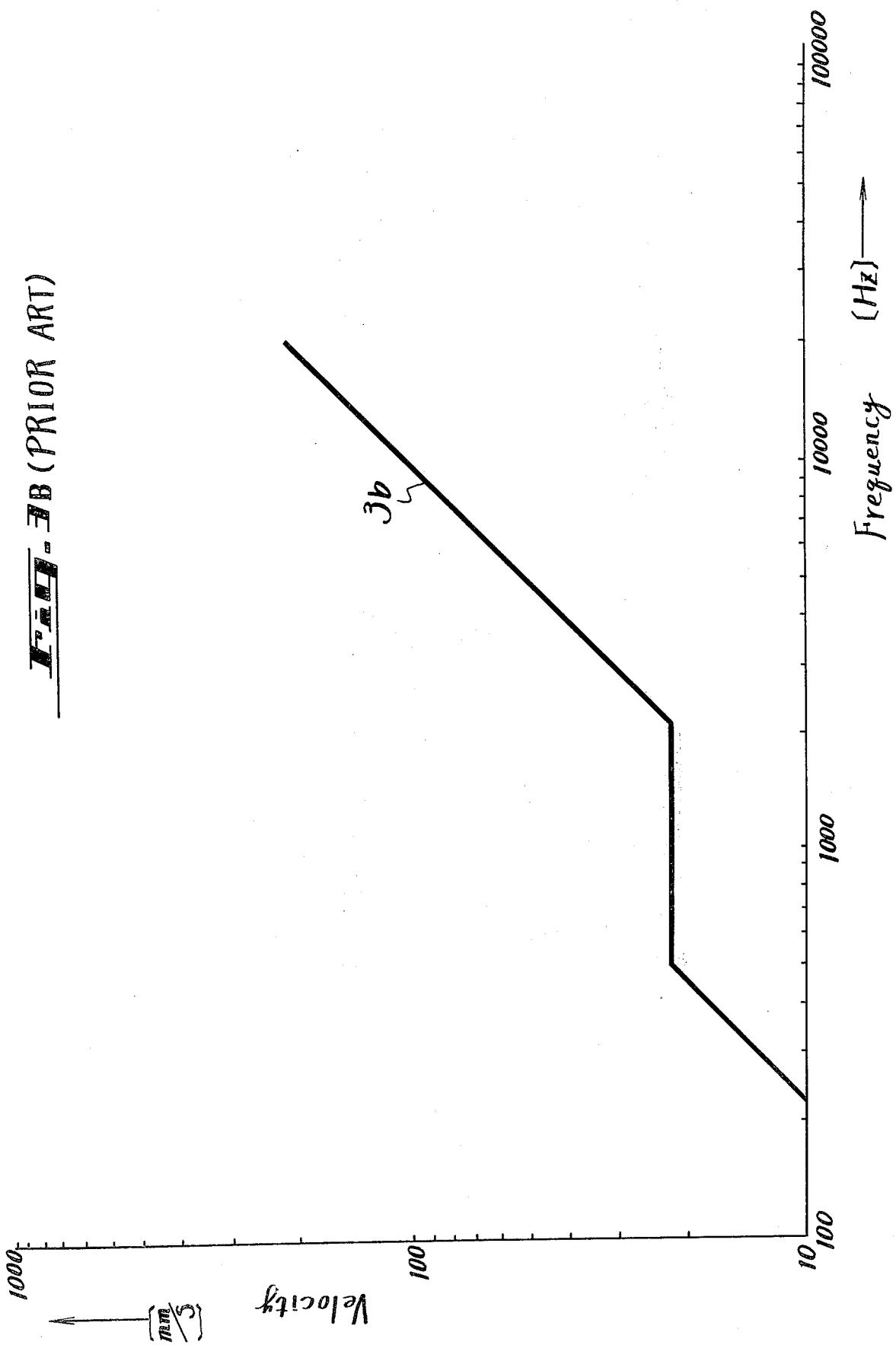
Figure 4:
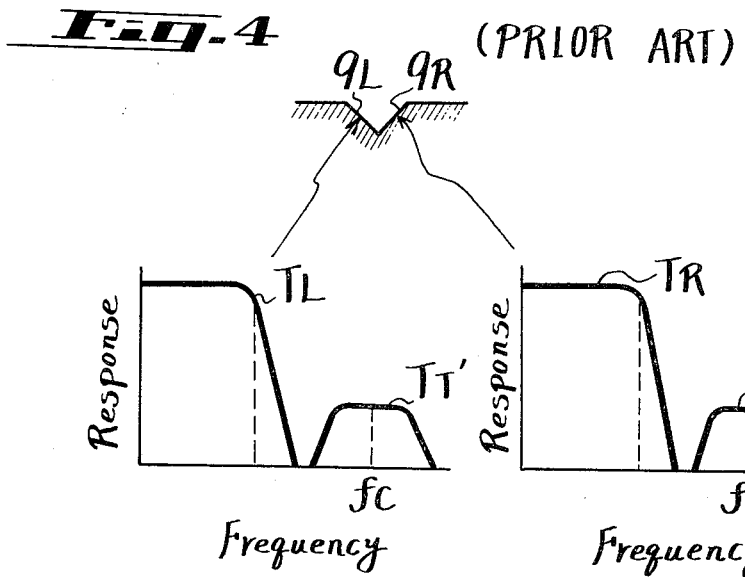
FIG. 4 shows schematic diagrams, for explaining the multi-directional sound signal record system.

Further, where the main channel signals are equalized with the recording RIAA characteristics shown in FIG. 3B and the diameter of the record is constant, the phase modulation index $m$ increases in accordance with the frequency of the main channel signals.

The total sum of these up-talks is indicated by 35. This characteristic 35 is obtained where the recording speed is 11.15mm/s and the diameter of the stylus is 5μ.

As described above, in the low-frequency range, the sub-channel signals are affected by such a distortion 34 of the demodulated signal as rumble which is caused by flutter, the up-talk 33 due to the tracking angle error and the beat distortion 32 due to the cross-talk between the sub-channel signals. In the intermediate- and high-frequency ranges, the sub-channel signals are influenced by the up-talk 35 owing to the tracing distortion and the clipping distortion 31b resulting from the limitation of the frequency band-width. In this specification, the up-talks 33 and 35 caused by the main channel signals, the beat distortion 32 caused by the cross-talk between the sub-channel signals and the clipping distortion 31b due to the limitation of the frequency bandwidth will hereinafter be generically referred to as the cross overmodulation distortion.

In view of the foregoing, the present invention is to eliminate the crossover modulation distortion. To this end, in the angular modulation of the sub-channel signals, its modulation curve is selected to be spaced apart from the lines indicative of the disturbances.

In the low-frequency range, the modulation curve is spaced apart from the lines 32, 33 and 34. In the intermediate- and high-frequency ranges, it is preferred to select the characteristic to be intermediate between the characteristic curves 31b and 35. The coincidence of the two main channel signals and the two sub-channel signals in frequency amplitude characteristic and in phase characteristic is advantageous for separation in the case of matrix reproducing of the four signals. Accordingly, the emphasis characteristic for the sub-channel signals which will ultimately provide a predetermined modulation curve is selected in accordance with the RIAA characteristics depicted in FIGS. 3A and 3B, thereby to avoid dispersion in the characteristic between the main channel signals and the sub-channel signals in the reproducing system. In this case, it is preferred to employ a characteristic that the corner frequency in the low-frequency range is a little raised in consideration of the disturbance characteristic 34 by flutter.

Based upon the foregoing discussion, the standard modulation curve for the sub-channel signals is selected such as indicated by 36 in FIG. 6. The standard modulation curve 36 is similar to the RIAA characteristic shown in FIG. 3A and takes the form of frequency modulation in the range of up to 100Hz of the sub-channel signal frequency, the form of phase modulation in the range of 100Hz to 500Hz, the form of frequency modulation in the range of 500Hz to 2100Hz, the form of phase modulation in the range of 2100 Hz to 6000Hz and the form of frequency modulation in the range above 6000Hz.

Figure 7:
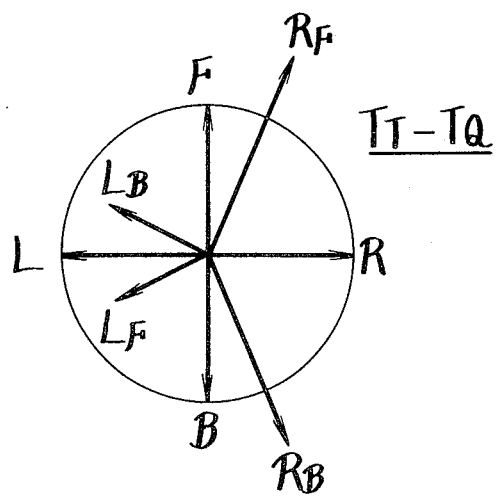
FIG. 7 is a vector diagram showing the difference between sub-channel signals TT and TQ.

Further, since the sub-channel signals TT and TQ in the aforementioned UM system are such as depicted in FIG. 2, the difference vector [TT − TQ] corresponding to the relative phase deviation of the two sub-channel signals to each other is such as shown in FIG. 7. As will be understood from FIG. 7, the relative phase deviation varies with the position of a sound source, so that the manner in which the beat distortion is produced changes with the position of the sound source.

If two signals (TT + $k$TQ) and (TT − $k$TQ) are selected as the sub-channel signals, their relative phase deviation is 2$k$TQ. Consequently, the relative phase deviation is uniformly distributed in accordance with the position of the sound source. If $k<0.38$, the relative phase deviation expressed as a vector is similar to the vector indication of the signal TQ and smaller in magnitude than the difference (TT−TQ) in the case where the speakers LF, RF, LB and RB have individual sound sources, respectively. Where $k<½$, 2$k$TQ becomes smaller than (TT−TQ) over a wide range of the position of the sound source.

FIG. 8 shows in block form one embodiment of the recording system constructed according to this invention described in the foregoing. The signals TL, TR, TT and TQ derived from an encoder 2 are applied to a matrix circuit 10 to derive therefrom the main channel signals TL and TR and newly formed sub-channel signals (TT+$k$TQ) and (TT − $k$TQ). The main channel signals TL and TR are supplied to a mixer circuit 5 through a recording equalizer circuit 4. On the other hand, the sub-channel signal (TT + $k$TQ) is supplied to a phase modulator 6 through an emphasis circuit 11a and the sub-channel signal (TT − $k$TQ) is supplied to the phase modulator 6 through an emphasis circuit 11b. By the emphasis circuits 11a and 11b and the phase modulator 6, the sub-channel signals (TT + $k$TQ) and (TT − $k$TQ) are angular-modulated in accordance with the modulation curve 36 shown in FIG. 6. Then, the main channel signals and the modulated sub-channel signals are distributed to two transmission channels and recorded by a 45—45 cutter 8 on the right and left walls of the sound groove.

FIG. 9 illustrates another embodiment of the recording system of this invention which is adapted to alleviate the up-talk due to the tracing distortion in the high-frequency range of the sub-channel signals.

This example employs two sub-channel signals (TT+$k$TQ) and (TT − $k$TQ) which are formed by the matrix circuit 10. The sub-channel signals (TT + kTQ) and (TT − kTQ) are applied to the emphasis circuits 11a and 11b, respectively. The characteristics of the emphasis circuits 11a and 11b are predetermined so that the sub-channel signal modulation curve may become that indicated by 36 in FIG. 6. This is for the elimination of the aforementioned cross modulation distortion.

The sub-channel signals (TT + kTQ) and (TT − kTQ) are supplied to adder circuits 12a and 12b, respectively. The adder circuits 12a and 12b are supplied with main channel signals for conpensation, respectively, which are produced in the following manner. The main channel signals TL and TR are supplied to level control circuits 13a and 13b through the recording equalizer 4, respectively. The level control circuits 13a and 13b are supplied with a control voltage associated with the operation of a cutter race of the 45—45 cutter 8.

The outputs from the level control circuits 13a and 13b are made equal to the component of the tracing distortion expressed by the aforesaid equation $$(m = \frac{rvw}{S^2}).$$

The outputs from the level control circuits 13a and 13b are applied to inverter circuits 14a and 14b, respectively. The output from the inverter circuit 14a, that is, the main channel signal for compensation, is added by the adder circuit 12a with the sub-channel signal (TT + kTQ) which is recorded on the same groove wall of the record. On the other hand, the output from the inverter circuit 14b, that is, the main channel signal for compensation, is added by the adder circuit 12b with the sub-channel signal which is recorded on the same groove wall.

The sub-channel signals (TT + kTQ)' and (TT − kTQ)', which are thus reversely compensated for an expected tracing distortion, are supplied to the phase modulator 6. The modulated sub-channel signals (TT + kTQ)'' and (TT − kTQ)'' derived from the phase modulator 6 are added with the main channel signals in the mixer circuit 5 to provide two signals [TL + (TT + kTQ)''] and [TR + (TT − kTQ)''], which are supplied through an amplifier 7 to the 45—45 cutter 8 and recorded thereby on the right and left walls of the sound groove, respectively.

With the present invention, since the sub-channel signals are reversely compensated corresponding to the expected tracing distortion during record cutting, it is possible to avoid the up-talk during reproducing. If an error of the diameter of the tip of the stylus is within 10%, the up-talk due to the tracing distortion can be lowered 20dB by phase modulation in opposite phase to the angular modulator of the recording system.

It is necessary that the main channel signals, which are supplied to the level control circuits 13a and 13b for the formation of the compensating main channel signals, be identical with those which are ultimately recorded on the walls of the sound groove. Accordingly, for ensuring the identity, it is also possible to supply the main channel signals to the level control circuits 13a and 13b through equilizers or like means.

Further, it has been already described that where the sub-channel signals (TT + kTQ) and (TT − kTQ) are used, the beat distortion is caused by the signal TQ of the reverse phase component between the sub-channel signals. If the signal TQ is reduced or removed in the frequency region in which the relative phase deviation increases and the beat distortion is likely to occur, the best distortion can be further decreased.

FIG. 10 shows in block form another embodiment of the recording system of this invention constructed in view of the above.

Of the signals TL, TR, TT and TQ derived from the encoder 2, the signal TQ is fed to the matrix circuit 10 through a high-pass filter 12. In this case, since the high-pass filter 15 has a phase characteristic, phase equalizers 16a, 16b and 16c are provided for the other signals, TL, TR and TT, respectively, thereby maintaining excellent phase relationships. Consequently, the frequency spectra of the signals TL, TR, TT and TQ, which are supplied to the matrix circuit 10, become such as shown in FIG. 11. The signals TL and TR have all the frequency components of bands necessary for reproduction of a sound field and the signals TT and TQ have minimum necessary frequency components and the signal TQ is cut off at low frequencies. Even if the low frequencies component of the signal TQ are cut off, it does not matter psychoacoustically in connection with the locations of the low- and high-pitched parts and, only with the signals TL, TR and TT, it is possible to expect a 4 channel stereo effect with practically sufficient separation.

The recording system shown in FIG. 10 is suitable for use not only in the UM system or the discrete 4 channel stereo system but also in the case where the so-called matrix system having the four channel effect with only the main channel signals is modified by adding two sub-channel signals.

In place of the filter for removing the low-frequency range of the signal TQ in which the beat distortion is likely to occur a limiter 17 may be provided which limits the level of the signal TQ when this signal reaches a certain level, that is, becomes so large as to cause the beat distortion, as shown in FIG. 12. The limiter 17 does not entirely cut off the low-frequency region of the signal TQ, so that it is possible to prevent substantially completely that the effect such as the feeling of presence, the location of sound sources, etc, are impaired.

The record, produced by the recording system of this invention such as depicted in FIG. 8 or 9 described previously, and the record, produced by the recording system such as shown in FIG. 10 or 12 which employs the high-pass filter 15 and the phase equlizers 16a, 16b and 16c or the limiter 17, can be reproduced by a reproducing system illustrated in FIG. 13.

In FIG. 13, the modulated sub-channel signals, which are separated by a band-pass filter 25 from a reproduced signal picked up by a pickup 21, are applied to a frequency demodulator 26. The demodulated outputs from the frequency demodulator 26 are supplied to a matrix circuit 28 through de-emphasis circuits 27a and 27b whose characteristics are opposite to those of the emphasis circuits 11a and 11b of the recording system. The matrix circuit 28 derives therefrom the sub-channel signals TT and TQ and supplied to a decoder 24 together with the main channel signals TL and TR. The decoder 24 derives therefrom audio signals $S_{LF}$, $S_{RF}$, $S_{LB}$ and $S_{RB}$ corresponding to sound sources of specific arrangement, which signals are amplified and supplied to the speakers LF, RF, LB and RB, respectively.

Further, in the case of supplying the signal TQ to the matrix circuit 10, it is supplied through an equalizer circuit 18 as shown in FIG. 14. This equalizer circuit 18 has such a frequency characteristic 40 as depicted in FIG. 15. By passing the signal TQ through the equalizer circuit 15, the modulation curve for the sub-channel signals (TT + $k$TQ) and (TT − $k$TQ) varies from a line 38 to that 39 in FIG. 16. With this, the region which exceeds the line 32 indicative of the limit of generation of the beat distortion becomes a lower frequency region and the beat distortion can be alleviated.

Also, instead of using the equalizer 18, the same effect can be obtained by making the emphasis circuits 11$a$ and 11$b$ different from each other in characteristic.

In the case of reproducing the record produced by the recording system shown in FIG. 14, the signal TQ derived from a matrix circuit 28 is supplied to an equalizer circuit 29 whose characteristic is opposite to that depicted in FIG. 15, and the signal TQ compensated by the equalizer circuit 29 is applied to a decoder 24, as illustrated in FIG. 17.

The encoder 2 and the matrix circuit 10 in the above-described recording system can be constructed in the form of one matrix circuit in practice. The same is true of the decoder 24 and the matrix circuit in the reproducing system.

The foregoing description has been given mainly with regard to the recording system but it is a matter of course that, also in the reproducing system, the emphasis characteristics of the sub-channel signals are similarly selected in accordance with the reproducing RIAA characteristics of the main channel signals.

With the present invention, since the emphasis characteristics for modulating the sub-channel signals based on the specified modulation curve 36 are selected in accordance with the recording RIAA characteristics of the main channel signals, the main channel signals and the sub-channel signals coincide with each other in the frequency amplitude characteristic and in the phase characteristic and excellent separation can be obtained. Further, according to this invention, the sub-channel signals are adapted by the matrix circuit such that the same phase component between the sub-channel signals increases and that the reverse phase component decreases. Consequently, it is possible to remove the beat distortion which results from the cross-talk between the modulated sub-channel signals which is caused by the reverse phase component. Moreover, even if the sub-channel signals are changed as mentioned above, the stereophonic effect is not deteriorated during reproducing.

The present invention is of similar utility when employed not only in the UM system but also in a system called as the CD-4 system and so on. Further, this invention is applicable not only to the case of using a disc record as a recording medium but also to the case of employing a multi-track magnetic tape.

The present invention is not limited to the embodiments described as above, and many modifications and variations may be made by those skilled in the art without departing from the spirit and scope of the novel concepts of the invention.

What we claim is:

1. Apparatus for recording multi-directional sound signals on a recording medium, as main channel signals and angularly modulated signals, comprising
    means for supplying multi-directional sound source input signals,
    encoding circuit means for providing first and second main channel signals and first and second subchannel signals from said input signals,
    matrix circuit means for providing a subchannel sum signal of said subchannel signals and a subchannel difference signal of said subchannel signals such that said first and second subchannel signals are added in said sum signal and such that said second subchannel signal is subtracted from said first subchannel signal in said difference signal,
    oscillator means for providing a carrier signal having a predetermined frequency,
    modulator means for angularly modulating said carrier signal with said subchannel sum signal to provide a first angularly modulated subchannel signal, and
    modulator means for angularly modulating said carrier signal with said subchannel difference signal to provide a second angularly modulated subchannel signal,
    said matrix circuit means including means for decreasing the relative phase deviation between said first modulated subchannel signal and said second modulated subchannel signal by decreasing the amplitude, in said sum and difference signals, of said second subchannel signal with respect to said first subchannel signal,
    mixing means for adding said first angularly modulated subchannel signal and said first main channel signal to provide a first recording signal for said recording medium,
    mixing means for adding said second angularly modulated subchannel signal and said second main channel signal to provide a second recording signal for said recording medium, and
    means for recording said first and second recording signals, respectively, on said recording medium.

2. Apparatus in accordance with claim 1 wherein said encoding circuit means comprises means for providing main channel signals TL and TR, and first and second subchannel signals TT and TQ in accordance with the UM matrixing system, wherein said means for decreasing the relative phase deviation between said modulated subchannel signals reduces signal TQ by a factor of $k$, where $k$ is less than ½, to provide a signal $k$TQ, and wherein said matrix circuit means comprises means for combining said subchannel signal TT with said signal $k$TQ to provide said subchannel sum signal as TT + $k$TQ and said subchannel difference signal as TT − $k$TQ, wherein said relative phase deviation between said angularly modulated subchannel signals is 2$k$TQ.

3. Apparatus in accordance with claim 2 where $k$ is less than 0.38.

4. Apparatus in accordance with claim 2 wherein $k$ is less than 0.38 and wherein said means for decreasing the relative phase deviation between said angularly modulated subchannel signals further comprises limiter means for limiting the lower frequency range of said subchannel signal TQ.

5. Apparatus in accordance with claim 2 wherein $k$ is less than 0.38 and wherein said means for decreasing said relative phase deviation between said angularly modulated subchannel signals further comprises high pass filter means for removing the lower frequency range of said subchannel signal TQ.

6. Apparatus in accordance with claim 2 wherein said means for decreasing said relative phase deviation between said angularly modulated subchannel signals further comprises emphasis circuit means for said subchannel signal TQ having a frequency-response characteristic which is substantially constant below a frequency $f1$, increases between frequency $f1$ and a frequency $f2$ of about 100 Hz, and is substantially constant above said frequency $f2$ at a response level higher than the response level below said frequency $f1$.

7. Apparatus in accordance with claim 1 wherein said relative phase deviation decreasing means decreases the amplitude of said second subchannel signal with respect to said first subchannel signal by a factor of at least ½.

8. Apparatus in accordance with claim 7 wherein said means for decreasing the relative phase deviation between said modulated subchannel signals comprises limiter means for limiting the lower frequency range of said second subchannel signal.

9. Apparatus in accordance with claim 7 wherein said means for decreasing the relative phase deviation between said angularly modulated subchannel signals comprises high pass filter means for removing the lower frequency range of said second subchannel signal.

10. Apparatus in accordance with claim 7 wherein said means for decreasing the relative phase deviation between said angularly modulated subchannel signals comprises emphasis circuit means for said second subchannel signal having a frequency dependent response characteristic in which the response is relatively reduced at frequencies below about 100 Hz.

11. Apparatus in accordance with claim 7 wherein said recording means is a disc recording means for recording said first and second recording signals on the first and second groove walls, respectively, of a recording disc.

* * * * *